Feb. 7, 1967   C. C. BECK   3,302,841
AUTOMATIC DUST BOTTOM ASSEMBLER
Filed Oct. 21, 1965   5 Sheets-Sheet 2
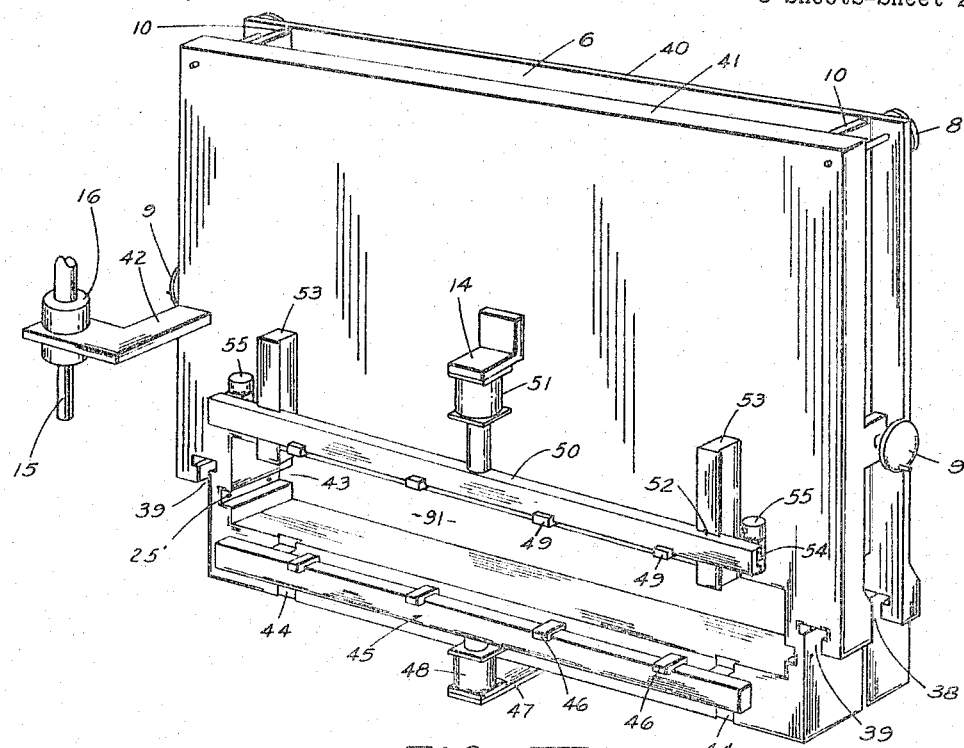
FIG. III
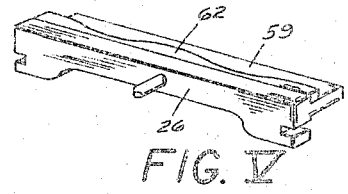
FIG. V
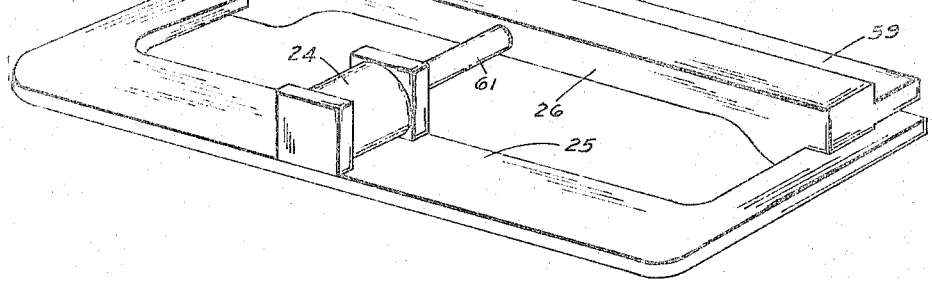
FIG. IV
INVENTOR.
Clayborn C. Beck
BY Paul R. Gillison, Agent Feb. 7, 1967 C. C. BECK 3,302,841
AUTOMATIC DUST BOTTOM ASSEMBLER
Filed Oct. 21, 1965 5 Sheets-Sheet 3
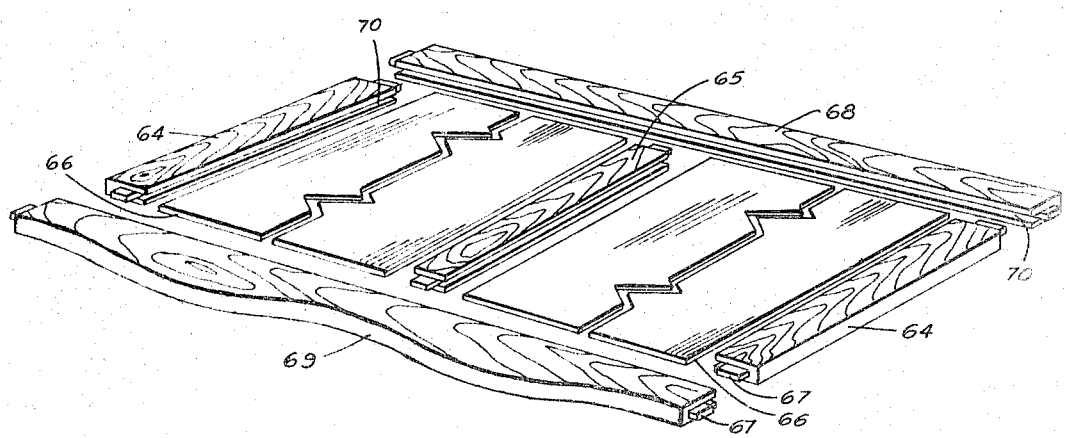
FIG. VII
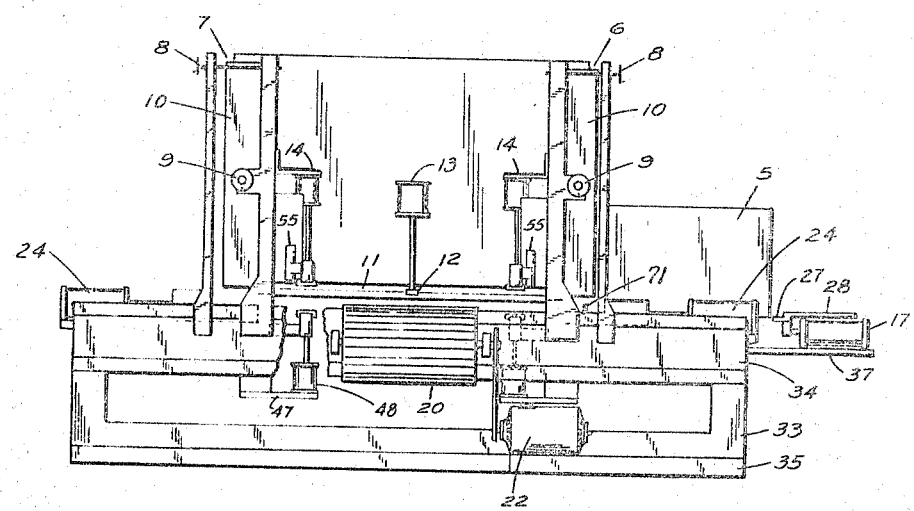
FIG. VI
INVENTOR.
Clayborne C. Beck
BY
Paul R. Gillson, Agent

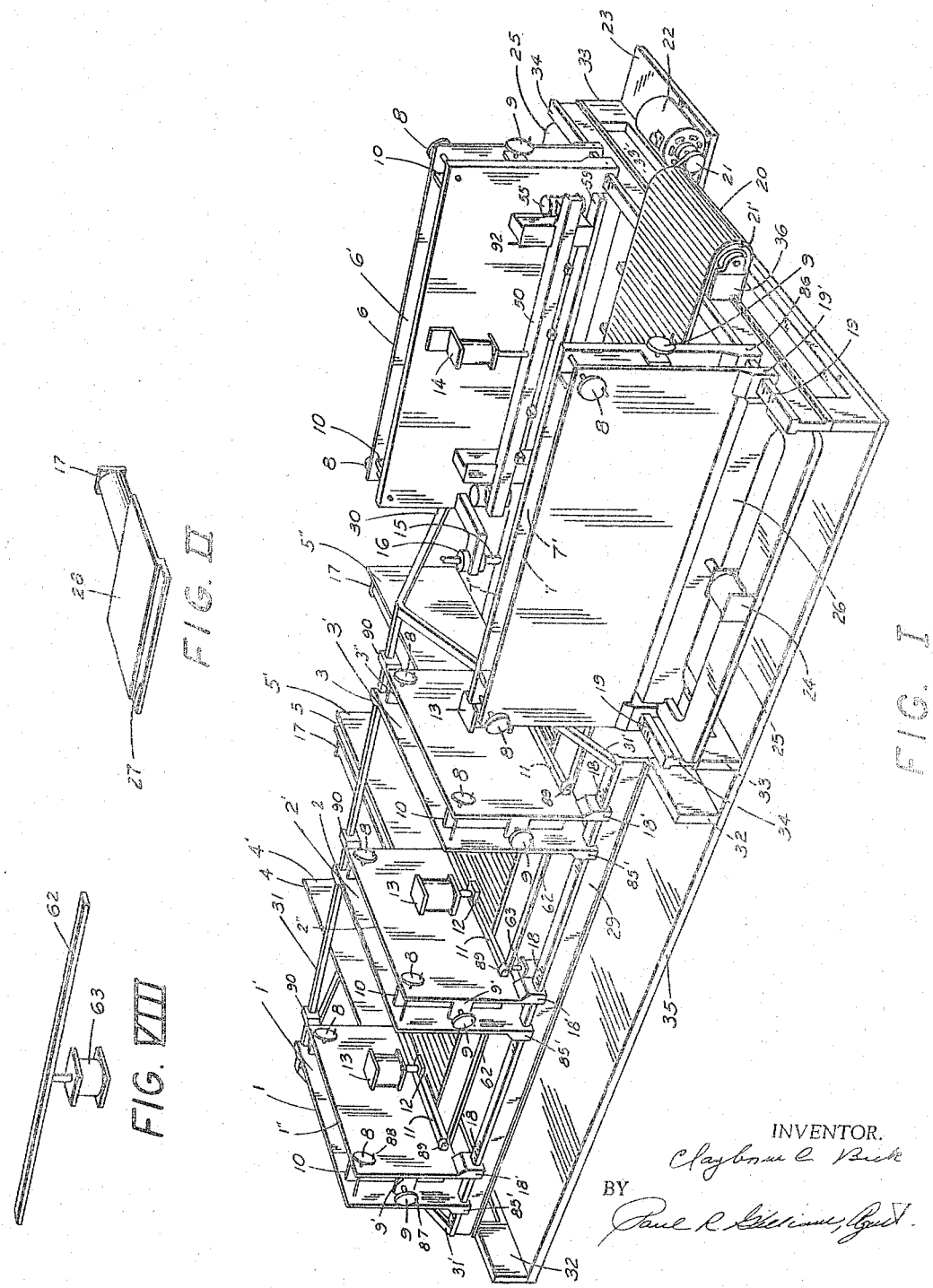

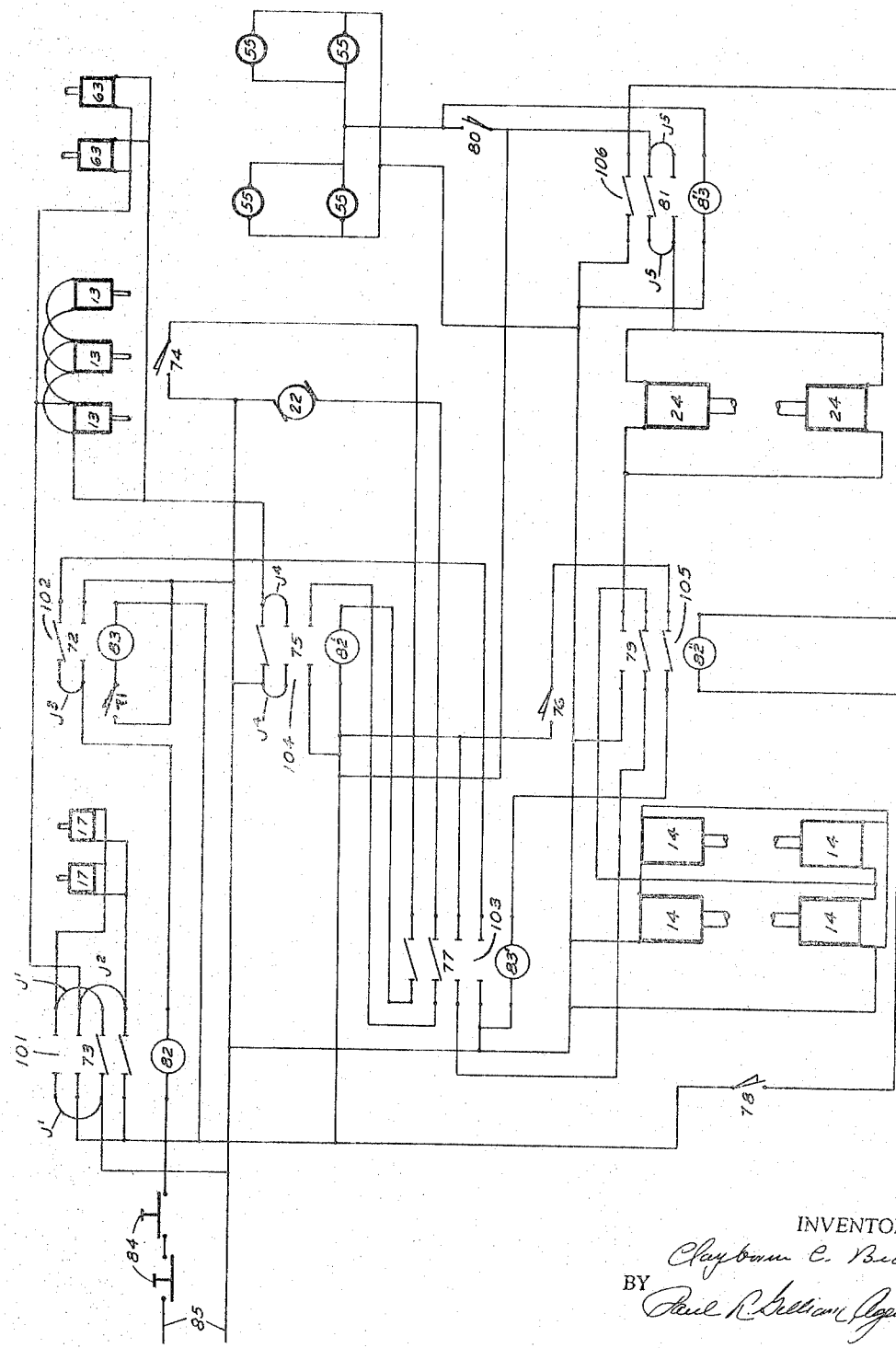

Feb. 7, 1967 C. C. BECK 3,302,841
AUTOMATIC DUST BOTTOM ASSEMBLER
Filed Oct. 21, 1965 5 Sheets-Sheet 5
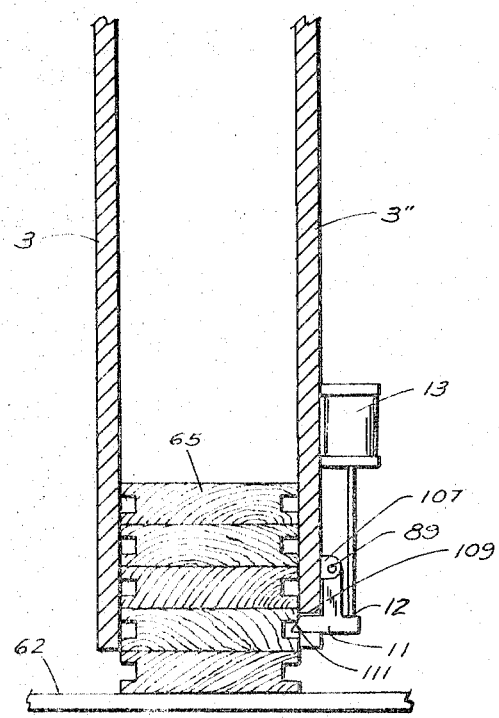
FIG. X
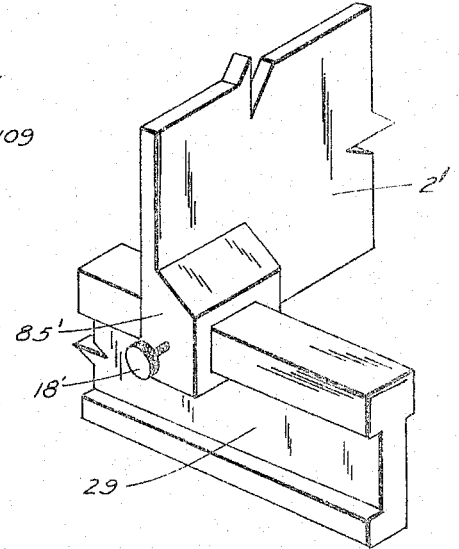
FIG. XI
INVENTOR.
Clarence C Beck
BY
Paul R. Gilliam,
Agent

United States Patent Office 3,302,841
Patented Feb. 7, 1967

3,302,841
AUTOMATIC DUST BOTTOM ASSEMBLER
Clayborne Colon Beck, 711 Spruce St.,
Bedford, Va. 24523
Filed Oct. 21, 1965, Ser. No. 500,418
5 Claims. (Cl. 227—14)

The instant invention relates to a machine for automatically assemblying dust bottoms in the furniture manufacturing industry and is a continuation-in-part of application Serial No. 363,320 filed March 30, 1964, now abandoned.

The object of the instant invention is to provide a machine of the class described which is capable of instant and accurate adjustment to assemble dust bottoms of all sizes and shapes and to apply glue and nails to said dust bottoms as they are assembled.

A further object is to provide a machine wherein one man may handle the complete operation of assembling the dust bottoms, yet increase the present speed of assembling said dust bottoms.

A still further object is to provide a machine for automatically assembling dust bottoms having five or more parts.

Still another object is to provide a machine that will assemble dust bottoms whose rails, ends and monts will vary in configuration and length, width, and thickness.

Another object is to provide a machine wherein compensation is had for the warpage and distortions of the various parts of the dust bottoms to be assembled.

Yet, another object is to provide a sensitive machine to assemble dust bottoms wherein the parts assembled may vary from 1/16 of an inch to an indefinite thickness.

Another object is to automatically assemble interdispersed dust bottoms parts of various sizes and configurations.

Another object is to provide dual, adjustable and interconnected hoppers for parts of the dust bottom to be assembled; locating each of said parts in an aligned and predetermined position; providing glue and nails to desired portions of the dust bottoms; and finally clamping the said parts into an integral whole.

Other objects will become apparent as the invention is fully described in detail.

A dust bottom is restricted in use and application to the furniture industry and comprises one or more panels (usually of thin and often flexible material); a front rail; a back rail; two end sections or rails (to be referred to as ends); and at least one section or rail called a mont located between said end sections (as shown in FIG. VII).

The monts are provided with a groove (corresponding to the thickness of the panels) on two sides thereof and the rails and ends are provided with a groove (corresponding to the thickness of the panels) on the inner side.

After a dust bottom is assembled, it is placed between the drawers of furniture by securing same to the furniture case, whereby each drawer is protected from dust and the like that may drop or filter in while the drawers are closed.

Each of the rails, ends, and monts (FIG. VII) adapted to interlock with each other or with the furniture case to which it is attached.

At times the outside edges of the rails and ends (those edges opposite the panels) form a part of the exterior furniture case; thus they vary in configuration to correspond to the design of the particular furniture.

Each part of the dust bottom is placed in a separate adjustable hopper. Then the panels are moved from their hoppers and fed to the hoppers containing the ends and monts wherein the panels are forced into the grooves on the ends and monts.

This partly assembled dust bottom is then fed to a predetermined position with respect to a pair of spaced adjustable hoppers carrying the front and back rails. The rails are then pushed from their hoppers into a clamping relationship with the said partly assembled dust bottom. The panels fit into the grooves in the rails while the tenons on the mont and ends interlock with the rails; thus leaving the tenons on the rails free to interlock with the furniture case.

Glue is applied to the various parts of the partly assembled dust bottom as it moves toward the final assembly operation.

When the dust bottom is finally assembled (through the action of the rails being assembled), nails are applied at the desired points by the commercial nailers attached to the machine.

At the present time the assembling of dust bottoms is time consuming and tedious, resulting in long man hours and high cost. My invention permits one man to assemble the dust bottoms quickly and accurately. Once the hoppers are loaded, the machine can be set to turn out, automatically, the number of dust bottoms desired.

The instant invention can be fully or partially automatic as may be desired.

In order to fully comprehend the invention reference should be made to the drawings wherein reference numerals indicate the various parts wherein:

FIGURE I is a pictorial drawing showing the complete automatic dust bottom assembler.

FIGURE II is a view of the pusher and cylinder that remove the panels from their hoppers.

FIGURE III shows the detailed adjustable front and back rail hopper (since both are identical, only one is shown) with the nailers and flattening hold down.

FIGURE IV shows a detail of clamp or pusher for removing the front and back rails from the hoppers and clamping them to the partially assembled dust bottom.

FIGURE V shows a detail of the front rail clamp with a template to conform to the curvature of the front rail being assembled.

FIGURE VI is an end view of the assembler at right angles to FIG. I and showing the rail hoppers along with one of the end and panel hoppers.

FIGURE VII is a view of the dust bottom to be assembled.

FIGURE VIII is a view of the uplift or support bar that holds the ends and monts when they are released from their hoppers and in a position to receive the panels.

FIGURE IX shows the electrical circuit and the relationship of the mechanical parts.

FIGURE X is a view of the mont holding pivoted catch. The ends holding catches are identical.

FIGURE XI is an enlarged view of the hopper adjusting and holding screw.

Specifically, my invention comprises a base support 35 (FIG. I) with upturned flanges 32 and 33. One end and intermediate flanges 32—32 carry spaced beams 29 at each side thereof which support the ends and mont hoppers 1, 2, and 3; along with the panel hoppers 4 and 5.

The other end and intermediate flange 33—33 supports spaced beams 34 which carry the space rail hoppers 6 and 7. Spaced beams 34—34 are at right angles to the spaced beams 29—29.

A conveyor belt 20, supported and driven by a roller 21' carried by bracket 36, extends the full length of the base 35 closely adjacent to the under side of the hoppers 1, 2, and 3 and in the direct center between hoppers 6 and 7.

The belt 20 extends through the elongated openings 33' in the flanges 32, 32, 33, 33 provided thereby.

Note that the area between and beneath the spaced beams is open.

Connected to the roller 21' by a shaft is a pulley which is connected by a belt to a pulley 21 on the shaft of motor 22 (FIG. VI). Said motor is supported on bracket 23, attached to the base 35 or to the flange 33. The motor 22 drives the conveyor belt, as will be explained later.

Hoppers 1, 2, and 3 are identical and are formed with the sides 1', 1" 2', 2"; and 3', 3" respectively, adjustable mounted on beams 29 as at 85' (FIGURES I and XI). Each side 1", 2", and 3" has an integral ear 9'. Stops 10, at each end of the sides are attached to said sides through screw 9 having an enlarged head and handle 87 for turning same. The screw 9 is attached at one end to the stop 10 (as by welding or the like) and is attached to the ear 9' by threads providing therethrough; whereby the rotation of the screw causes the stop to move in or out.

The sides of each of said hopper are relatively adjustable to each other by a screw 8 with enlarged head and crank 88. Said screw is attached to one of the sides (as shown) and threadly received through an opening in the other side, whereby the rotation of the screw causes relative adjustment between the two sides.

Hoppers 6 and 7 having spaced sides 40 and 41 (FIGURE III) are constructed in the same manner described for the hoppers 1, 2, and 3, but are of larger size. Hoppers 6 and 7 are mounted on beams 34—34 as at 86 in a manner identical to that just described for hoppers 1, 2, and 3. The stops 10 and adjusting means 8 and 9 are also identical to those on the first mentioned hoppers.

Each hopper 1, 2, and 3 carries a bar grip 11 (FIG. X) pivoted to ears 89 attached to the hopper (or made integral therewith). Said bar acts through a slot in a hopper side. A cylinder 13 is attached to one side of the hopper and has a plunger attached as at 12 to the pivoted bar grip, whereby the movement of the plunger by the cylinder pivots the grip bar causing said bar to apply pressure to the bottom most end or mont located within the hopper or releases the pressure thereon; thus holding the monts or ends in a predetermined position in the hopper while allowing the bottom most one to drop on hold bar 62. This will be fully explained in conjunction with the circuit.

A bar 31 (FIG. I) is attached to the beams 29 (as by welding or the like) through an A frame 31'. This bar 31 aligns with the hopper 6 precisely, so as to locate the partially assembled dust bottom for receiving the rails in hoppers 6 and 7 by locating the hoppers 1, 2, and 3 in precise alignment with hoppers 6 and 7.

Each of the hoppers 1, 2, and 3 are mounted as at 90 by ears extending from said hoppers for movement along said bar when adjustment is necessary. Indicia 18 and lock screw 18' are used in setting and maintaining adjustment.

Located below the hopper 2 on each side of the hopper and attached to the beams 29 on the inner side thereof is a pair of spaced cylinders 63 having a hold-bar 62 attached to its plunger. Hold-bar 62 extends under hoppers 1, 2, and 3 and receives the ends 64 and monts 65 when they are released from the hopper by bar grip 11. Hold-bar 62 is located and arranged so that the groove 70 in the ends and monts are permitted to just clear the bottom of the hopper and in alignment with the panels located in the panel hoppers; thus when the panels 66 are pushed forward (as will be explained) they will slide in the grooves 70 and the then partially assembled dust bottom will be firmly held, as are the ends and monts as they receive the panels. Both sides work simultaneously. Pivoted bar 11 (FIG. X) comprises an end catch portion which bears against the sides of the ends or monts; thus holding them in the proper position.

Bar 11 has an ear 109 pivoted to an ear 107 as at 89.

Said ear 107 is attached to or integral with each of the hoppers 1, 2 and 3.

Bar 11 has an inclined surface 111 for clearing the end or mont being released. The solenoid 13 is attached to the edge opposite said surface 111 as at 12; thus, when the solenoid is activated, it moves the bar 11 about the pivot 89. It is to be noted that the movement is only ⅛ to ¼ inch.

When the pushbutton 84 is activated the pressure of the catch is released dropping ends and mont on bar 62. Bar 62 holds ends and monts in hopper until the end catch portion of bar 11 engages the next end or mont (not on bar 62); thus the partially assembled dust bottom can then be moved from under the hoppers without the ends and monts dropping down because of the catch applying pressure to the bottom most mont or end in their respective hoppers.

It is to be noted that each hopper 1, 2, and 3 have the same identical catch bar 11.

After the panels are received the cylinder 63 lowers the partially assembled dust bottom on to the conveyor belt 20 which moves same between hoppers 6 and 7 the tenons 67 of the ends, rails, and monts are always properly aligned with each other and the groove 70.

The panel hoppers 4 and 5 are fixed to a degree with respect to the hoppers 1, 2, and 3. The side 4' of hopper 4 is fixed to the inner side 1" of hopper 1 and the side 5" is fixed to the inner side 3" of hopper 3'. This allows the outer edge of the panel to always be aligned with the grooves 70 in the ends and monts (located in their respective hoppers); thus when the hoppers 1, 2, and 3 are adjusted to receive different size monts and ends, the panel hoppers will also be adjusted accordingly and be in alignment.

In a similar manner each inner side of the panel hoppers 4 and 5 is attached (as by welding, bolts or the like) to the corresponding side of hopper (mont) 2. Thus, when a different size mont or end is used or when a different size dust bottom is to be assembled, the movement of the ends and mont hoppers 1, 2, and 3 automatically adjusts the panel hoppers for the size of the panel that is to be used.

Each of the panel hoppers 4 and 5 is provided with a cylinder 17 mounted on a support 37 (FIG. VI) which is attached to the beam 29. The plunger of the cylinder is attached to a head 28 provided with a lip 27. The shape of the head 28 is necessary because of the usual thinness of the panel to be assembled and to hold all of the panels in the hopper. The lip 27 will serve as a support for the bottom panel as the edge above pushes the panel. The top surface 28 serves as a stop to prevent other panels from dropping before the plunger of the cylinder is retracted.

The front and back rail hoppers carrying the front and back rails 69–68 respectively, FIGURE VII are adjustably mounted, as previously stated, on the beams 34. Indicia 19 is used here, as in all places where adjustment is to be had, to assist the operator in setting the machine.

FIGURES III, IV, and V show the hoppers in detail. The hoppers are each provided with an opening 91 and slot 43 to receive the clamping head 26 and slide 25 respectively. Screws 25' lock the slide 25 in a predetermined position. Mounted on the slide 25 is a cylinder 24 with the clamp 26 attached to its plunger, whereby said clamp moves at right angles to the rotation of the conveyor belt. The clamp is provided with a lip portion 59 and functions in the same manner (as a stop) as explained for cylinder 17 and head 28.

Located on the inner side of each hoppers 6 and 7 are spaced supports 53—53 which carry a cross bar 50 adjustable thereon as by slots 52 and attached to or integral with the end of the plunger of cylinder 51. The cylinder 51 is attached to the side of the hopper by a bracket 14. The bracket may be integral with or attached to said hopper.

On each end of said cross bar 50 are standard commercial nailers 55 adjustably mounted by tongue and groove 54. These nailers are well known in the art.

Attached to the cross bar 50 are precisely located feet 49 which press down on the parts of the dust bottom to flatten same. This unit acts on top of the dust bottom.

The unit just described acts in conjunction with a second unit (acting on the bottom of dust bottom) which has a cross bar 45 and feet or fingers 46 attached thereto and in alignment with feet 49 for flattening parts of the dust bottom. The cross bar is attached to the plunger of the cylinder 48. Said cylinder is attached by a bracket 47 to the under edge of the outside hopper side.

The cross bar 45 is mounted to slide in grooves 44 in one side of the hopper, whereby movement of the cylinder 48 moves said cross bar and, consequently, feet 46 into pressure engagement with the dust bottom parts.

Simultaneously, cylinder 51 will move across bar 50 and feet 49 to engage the top of the dust bottom being assembled.

The feet 46–49 are so located as to press down on the panels and on the rails, monts, and ends near or on the intersection of each part of the dust bottom.

The nailers 55 insert nails through the joint 67 where the ends, monts, front and back rails interlock.

Mounted on the inner side of the hoppers 6 and 7 is bracket 42 carrying glue means 15 and 16. The nozzle 15 applies glue along the edge of the panel, mont, and ends as they slide by on the belt 20, just prior to receiving the front and back rails. The specific glue means may vary with personal preference and one or more types may be interchangeably used. Since there are many types of glue dispensers that could be used specific details of any one dispenser are now omitted.

FIGURE V shows a template 62 of the type to be used when clamping the dust bottom together. The various configurations of the rails call for a template to match the particular configuration; thus preventing scaring the rail and also permitting even pressure across the rail being assembled.

FIGURE IX shows the electrical diagram with 85 indicating the power source connected to a pushbutton 84 which stops or starts the assembler.

Relay 101 is a control type having two normally opened and two normally closed contacts indicated by 73 and used in conjunction with a solenoid 82.

One side of the pushbutton 84 is connected to one side of the solenoid and to the bottom or lower normally closed contacts 73.

A jumper J' is used on both the input and output side and connecting one of the normally closed contacts with one normally opened contact. On the output side a second jumper J' is used connecting a second normally closed contact with a normally opened contact.

Connected at one terminal to the output side of relay 101 are the panel pusher cylinders 17. The other terminal of the cylinders is connected together to operate simultaneously.

A second relay 102 is connected by contacts normally opened 72 to a terminal of solenoid 82. This relay has a jumper J³ across its two circuits—one normally opened the other normally closed. A solenoid 83 is also used in this relay and is of the "drop-out" type in which a momentary current will activate the solenoid.

Applicant uses a common double-acting air cylinder which is activated by a solenoid switch built therein by the manufacturer.

A momentary spark or current will activate the solenoid and cause said solenoid to reverse itself from whatever position it is in; which in turn controls the flow of air pressure into either end of the air cylinder.

This same solenoid exhausts at one end or the other, as air pressure is applied to the opposite end.

Each solenoid has two standard adjusting screws at one end thereof, wherein the air pressure coming in at each end can be adjusted to increase or decrease the volume of air. It is therefore possible to retard or speed up the action of the cylinder in either or both directions.

Solenoid 83 is connected to the normally opened limit switch 71 (all limit switches used herein will be normally opened and will be referred to as a limit switch only). The other terminal of the limit switch is connected directly to the power source 85. The remaining terminal of solenoid 83 is connected directly to the power source 85.

The output side of the normally opened-normally closed contacts 72 in relay 102 is connected to the limit switch 71. By this connection the limit switch 71 performs two functions. The first is to activate solenoid 83 and the second is to activate solenoid 82 simultaneously therewith. From the upper or normally closed contact 72 connection is made with a third relay 103 (77 normally opened) which is a drop out type having two normally opened circuits and two normally closed circuits indicated by 77 in connection with a solenoid 83'.

A connection is made from the normally opened contacts 73 of relay 101 (which has been jumped on the output side—as previously set forth) directly to one terminal of one of the three interconnected end and mont holding cylinders 13. The opposite side of the same circuit is connected to the pushbutton 84; and also a connection is made from the same contact 73 to the two interconnected monts and ends supports cylinders 63 (which supports the bars 62—62). The opposite side of this terminal is connected to the source 85.

The fourth relay 104 is connected directly to the power source 85 by normally closed circuit 75. Relay 104 is of the control type having three poles with two normally opened circuits and one normally closed circuit. The center normally opened circuit and the top normally closed circuit have a jumper J⁴ on both the input and output sides. From the normally closed contact 75 of this relay 104 a connection is made to the opposite sides of one of the three interconnected cylinders 13 and the two interconnected cylinders 63.

A second limit switch 74 is connected to the main power source 85. The opposite terminal of limit switch 74 is connected to the normally closed circuit contact 77 of the relay 103.

Motor 22 is connected directly to the power source 85 and solenoid 82' is connected directly to the power source 85.

The opposite terminal of solenoid 82' is connected to the normally closed contacts 77 of relay 103.

From this normally opened circuit 77 of relay 103 a connection is made to positioning switch 76. The opposite terminal connects to the normally closed contacts of relay 105. From the normally opened circuit or contact 75 of relay 104 a connection is made to the normally closed contact or circuit 77 of the third relay 103 and from the opposite normally closed contact 77 (same circuit) of relay 103, a connection is made to the remaining terminal of the motor 22.

In relay 104 as previously stated a jumper J⁴ is used on both sides of the contacts. The double jumper J⁴ is for the express purpose of causing a break in the current to reverse the action on the holding cylinders 13 which holds the ends and monts in the hoppers.

Relay 105 is connected to the power source 85 by the normally opened contact 79. Solenoid 83' is connected directly to the power source 85 and from relay 103. Through the normally opened contacts 77, as previously set forth, a connection is had to the normally closed contacts 72 of the relay 102.

A connection from the power source 85 is had to the normally opened contacts 77 of relay 103.

From the solenoid 83' of relay 103 (opposite side) a connection is had to the normally closed contacts 79 of relay 105.

From the opposite side of the normally closed contacts 79 of relay 105 a connection is had to limit switch 76. The opposite side of switch 76 connects directly to the power source 85.

In relay 105 by contacts 79 normally closed a connection is had to the four hold down cylinders 14 which are interconnected with each other and act simultaneously. A direct connection is had from the power source 85 to the other terminal of cylinders 14.

A direct line goes from the power source 85 to limit switch 78 and from the opposite terminal of 78 a connection is made to control solenoid 82″ in relay 105.

The opposite of solenoid 82″ is connected to the sixth relay 106 through normally closed contacts 81.

Relay 106 is a three pole—two normally closed—one normally opened drop out type. A direct connection is made to one of the normally closed contacts 81 of relay 106 from the power source 85.

The jumper J5′ is used in relay 106 connecting both opposite input and output side contacts 81 of a normally closed and normally opened circuit.

A direct line from the power source is connected to the normally closed contacts (output side) 81 of relay 106.

From the normally opened output 81 a connection is had to the two interconnected cylinders 24 and from solenoid 83″ a direct connection is made to the power source 85.

From the opposite side or terminal of solenoid 83″ a connection is made to limit switch 80 and the other terminal of limit switch 80 is connected directly to the power source 85.

In relay 105, from normally opened contacts 79 a connection is had to cylinders 24.

From switch 80 a connection is made to the nailers 55 and from the main power source 85 a connection is had to each of said interconnected nailers.

Reference numerals 71, 74, and 76 indicate the micro switches contacted by the cylinders 17 and 24 as they complete their stroke which causes the cylinders to react in an opposite direction.

To more clearly set forth my invention the operational procedure is now given:

The hoppers are first adjusted to fit the size of the front and back rails; the ends; the monts; and panels. The adjustment of the end and mont hoppers 1, 2 and 3 would automatically adjust the panel hoppers 4 and 5.

In each of the hoppers the length is adjusted by turning screw 9. This moves the stop 10 to the desired position.

The width of the hopper is adjusted by screws 8 at each end thereof.

The location of the hoppers with respect to each other is done by moving said hoppers along the beams 29 and 34. This would adjust for the size of the dust bottom to be assembled.

After the hoppers are adjusted as desired, the operator loads each of them with a given part of the dust bottom to be assembled. The Assembler is now ready to assemble the dust bottoms.

Pushbutton 84 is now pressed activating the assembler. This first causes the panel cylinders 17 to operate and push the panels 66 from their respective hoppers into the aligned grooves on the mont and ends. When the panel cylinders 17 are all the way forward, this trips a limit switch 71; thus activating a relay 101 which activates relay 100 which causes panel cylinders 17 to reverse and also causes holding cylinders 13 on the side of the hoppers 1, 2, and 3 to release pivoted bar 11; and this places the partly assembled dust bottom on belt.

More specifically, when pushbutton 84 is activated, the panels 66 are moved from their respective hoppers into the proper aligned grooves on the ends and monts.

Said ends and monts are held in a predetermined position against any sidewise movement whatever by the hold bar 62 pressing against the bottom of the ends and mont being assembled and the fact that the part of the ends and mont above the tenon 67 (FIGURE VII and X) remain in the hopper.

The pivoted bar does not release another end or mont until hold bar 62 was lowered the partly assembled dust bottom onto the conveyor belt and returns to its high position. In fact, the hold bar 62 serves as the bottom of each hopper; yet permitting exposure of the grooves of the ends and monts.

When panel pusher cylinder 17 pushes panel 66 into the grooves in the sides of the ends and mont which grooves are now slightly below the bottom of the hoppers, a limited switch 71 which activates a relay 101 that in turn activates a second relay 100 as previously explained. This causes a reverse action on the end and mont hold bar 62 as well as the holder holding cylinders 13.

When the partially assembled dust bottom is on the belt 20, a limit switch 74 is tripped applying current to the conveyor belt motor 22 by activating relay 104. The motor can run directly off current or have an electrically activated clutch brake assembly. This relay 104 also resets the monts, rails, and ends holding cylinders 13–14.

When the belt 20 carries partially assembled dust bottom to a predetermined position between the front and back rail hoppers 6–7, the clamp bars limit switch 76 is tripped which activates the relay 103, which in turn stops the conveyor motor 22 (or if used, activates a clutch brake assembly). Relay 103 also activates top and bottom cylinders 14 (as previously pointed out) which carry the hold down 46–49 for flattening the dust bottom being assembled.

When the holddown cylinders 14 act, they trip a limit switch 78 which activates relay 105 which in turn activates front and back clamp bar cylinders 24 and also reactivate the relay 101 that controls movement of the cylinders 17 which push the panels in place; thus starting the operational procedure again.

When the front and back pressure bar cylinders 24 have pushed a front and back dust bottom rail from the respective hoppers 6 and 7 and engaged the front and back rails to the preassembled part of the dust bottom, the cylinders 24 activate a limit switch 80 which in turn activates the nailers 55 (or a switch, if the nailers are air operated) and at the same time applies current to relay 106 which reverses the rail bar cylinders, assembly hold down cylinders and allows a current to flow through the closed limit switch 74 (located under the dust bottom assembler); the closed switch 74 starts the conveyor motor 22. This procedure results in automatic assembly.

More specifically, as previously set forth, a line from the source 85 through the normally closed points 81 is connected to the cylinders 24. The opposite terminal of 24 permits current to go to normally opened points 79 of relay 105. The opposite terminal of normally opened 79 of 105 is connected to the main source 85.

From source 85 a direct line is connected to normally closed points 81 of relay 106. From the opposite terminal of 81 a connection is made to solenoid 82″ of 105. From the opposite terminal of 82″ a connection is made to limit switch 78. The opposite terminal 78 is connected to source 85.

Thus when 78 is tripped solenoid 82″ acts turning current on cylinders 24. They are now in a holding action.

When 83″ acts this causes contact 81 of relay 106 to break and in turn causes cylinder 24 to reverse. It is to be noted that all switches can be manually tripped for assembling any dust bottom.

The cylinders used in the instant invention are activated by a momentary current as previously explained which will cause them to alternate their direction of movement.

Having fully described and disclosed my invention and operation thereof, I therefore claim the following to be new, novel and patentable:

1. An automatic dust bottom assembling device for assembling dust bottom composed of panels and grooved ends, monts, and rails, comprising a plurality of adjustable and aligned ends and mont hoppers mounted on a first pair of parallel space aligned support for relative adjustment therebetween; adjustable panel hoppers attached to said ends and mont hoppers at one end thereof for adjustment therewith; a pivoted bar mounted on each of said ends and mont hoppers and adapted to engage ends and monts located therein; means to activate said pivoted bar; movable spaced bars located below said ends and mont hoppers in space relationship with said pivoted bars to clamp the parts to be assembled therebetween; solenoid actuated panel pushers having an extending stepped lip portion attached to one support of said first pair of parallel supports and in alignment with said parallel hoppers, whereby said panels are moved from said hoppers onto the grooves and the ends and monts; means connected with said spaced bars to release the partially assembled dustbottom therebetween; a second pair of space parallel supports extending at right angles to said first pair; a pair of adjustable spaced rail hoppers, adjustably mounted on said second pair of supports; a conveyor belt extending under the ends and mont hoppers and between said rail hoppers in alignment therewith, whereby the release of the partially assembled dustbottom on said conveyor belt conveys same to a precise position between the rail hoppers; a motor to activate said conveyor belt; and solenoid actuated pusher means on rail said hoppers for assembling rails to said mont, ends, and panels.

2. The combination according to claim 1 wherein each of said rail hoppers are provided with adjustably mounted above and below spaced press bars, adjustable mounted on each side of an opening in said rail hopper, and carrying spaced pressure fingers thereon; whereby upon actuation of said solenoid said pressure fingers engage a dustbottom therebetween; glue applying means supported by said rail hopper to apply glue to panel edges passing thereunder on said conveyor; and nailers attached to said press bars at each end thereof, whereby glue and nails are applied to the dustbottom being assembled.

3. The combination according to claim 1 wherein said pivoted bar comprises an upstanding ear pivoted to a second ear extending from the side of said hopper; a rod pivoted to said bar outwardly of said ear; a solenoid attached to said rod whereby actuation of said solenoid pivots said bar; said bar having a slightly inclined forward portion to engage the ends and monts.

4. The combination according to claim 3 wherein said movable spaced bars are two in number and are located adjacent each end of the end and mont hoppers in spaced relationship; said spaced bars each being attached to a solenoid at the under side whereby each actuation of said solenoid raises and lowers the said spaced bar.

5. The combination according to claim 1, wherein each of the ends, monts, and rail hoppers, comprises interconnected aligned sides; each of said hoppers having one side with an ear projecting therefrom, a screw threaded through said ear and attached to an adjustable end of said hopper, whereby rotation of said screw moves said end relative to said side; a second screw extending at right angles to said first screw and threadedly connected to one side of said hopper while attached to the opposite side whereby movement of said second screw adjusts said sides relative to each other.

References Cited by the Examiner
UNITED STATES PATENTS

| | | | |
|---|---|---|---|
| 350,943 | 10/1886 | Richardson | 227—14 XR |
| 1,137,854 | 5/1915 | Frantz | 227—14 |
| 1,463,727 | 7/1923 | Shellenberger | 227—45 |
| 2,075,795 | 4/1937 | Babcock | 227—14 XR |
| 2,111,081 | 3/1938 | Taylor | 227—45 |
| 2,279,638 | 4/1942 | Paxton et al. | 227—50 |

GRANVILLE Y. CUSTER, JR., *Primary Examiner.*